US008179228B2

(12) United States Patent
Colley, III et al.

(10) Patent No.: US 8,179,228 B2
(45) Date of Patent: *May 15, 2012

(54) DRAWER CONTROL APPARATUS

(75) Inventors: William C. Colley, III, Oberlin, OH (US); Markos Pantelis Paradissis, Vermilion, OH (US)

(73) Assignee: MV Circuit Design Inc., Vermilion, OH (US)

( * ) Notice: Subject to any disclaimer, the term of this patent is extended or adjusted under 35 U.S.C. 154(b) by 285 days.

This patent is subject to a terminal disclaimer.

(21) Appl. No.: 12/688,990

(22) Filed: Jan. 18, 2010

(65) Prior Publication Data

US 2010/0134243 A1 Jun. 3, 2010

Related U.S. Application Data

(63) Continuation-in-part of application No. 12/212,763, filed on Sep. 18, 2008, now Pat. No. 8,085,128.

(51) Int. Cl.
*G05B 19/00* (2006.01)

(52) U.S. Cl. ...... 340/5.7; 340/5.54; 340/5.71; 340/5.73; 70/264; 70/278.1; 49/16

(58) Field of Classification Search ................ 340/5.54, 340/5.7, 5.71, 5.73; 70/264, 278.1; 49/16
See application file for complete search history.

(56) References Cited

U.S. PATENT DOCUMENTS

| | | | | |
|---|---|---|---|---|
| 2,765,648 | A | 10/1956 | Hatcher | |
| 3,913,263 | A | 10/1975 | Butt | |
| 4,232,354 | A | 11/1980 | Mueller et al. | |
| 4,496,121 | A * | 1/1985 | Berlin | 244/99.13 |
| 5,034,878 | A * | 7/1991 | Haapala et al. | 709/221 |
| 5,359,322 | A * | 10/1994 | Murray | 340/5.5 |
| 5,534,846 | A * | 7/1996 | Kuroda | 340/426.28 |
| 5,745,366 | A | 4/1998 | Higham et al. | |
| 5,805,456 | A | 9/1998 | Higham et al. | |
| 5,883,806 | A | 3/1999 | Meador et al. | |
| 5,905,653 | A | 5/1999 | Higham et al. | |
| 5,941,106 | A | 8/1999 | Williamson et al. | |
| 6,011,999 | A | 1/2000 | Holmes | |
| 6,609,047 | B1 | 8/2003 | Lipps | |
| 7,263,410 | B1 | 8/2007 | Frederick et al. | |
| 2007/0051598 | A1 * | 3/2007 | Nye-Hingston et al. | 200/50.02 |

OTHER PUBLICATIONS

Response to Office Action dated Aug. 31, 2011 filed on Sep. 13, 2011.

* cited by examiner

*Primary Examiner* — George Bugg
*Assistant Examiner* — Sisay Yacob
(74) *Attorney, Agent, or Firm* — Renner, Otto, Boisselle & Sklar, LLP

(57) ABSTRACT

A device for selectively controlling access to a plurality of secure areas includes a driver circuit including a plurality of drivers, and a plurality of access modules each assigned to a corresponding secure area of the plurality of secure areas. Each access module is operatively coupled to at least one actuator operative to grant or deny access to the corresponding secure area. Unused drivers provided to a first access module of the plurality of access modules are cascaded to a second access module of the plurality of access modules.

18 Claims, 9 Drawing Sheets

DRAWER CONTROL APPARATUS

RELATED APPLICATION DATA

This application is a continuation-in-part of U.S. application Ser. No. 12/212,763 filed on Dec. 1, 2008, which claims priority of U.S. Provisional Application No. 61/030,318 filed on Feb. 21, 2008, both of which are incorporated herein by reference in their entirety.

TECHNICAL FIELD OF THE INVENTION

The present invention relates to a method, apparatus and system for selectively controlling access to a secure area, such as one or more lockable drawers.

DESCRIPTION OF THE RELATED ART

In healthcare facilities, e.g., hospitals, medical products prescribed to patients may be temporarily stored in medication-dispensing units. Typically, a healthcare facility has one or more medication-dispensing units located on each floor and/or nursing station of the healthcare facility for storing medical products prescribed to patients on that floor. Each of the medication-dispensing units may include lockable storage compartments to limit access of the medical products contained therein to authorized healthcare workers. Controlled substances, such as morphine, may be segregated into individual storage compartments in a medication-dispensing unit to control access to these substances.

A healthcare worker, e.g., nurse, may log onto a medication-dispensing unit before administering medical products to patients. In order to authenticate the healthcare worker logging on, the dispensing unit may require him/her to scan an identification badge. Alternatively, the healthcare worker may gain access to the medical products in the dispensing unit with an electronic or manual key. Once logged on or otherwise granted access to the dispensing unit, the healthcare worker may pull up a list of patients assigned to him/her, including the medical products to be administered to the respective patients. The healthcare worker then may remove the medical products identified in the list of patients from the dispensing unit. In a further alternative, the dispensing unit may automatically grant the healthcare worker access to one or more individual storage compartments including medical products.

SUMMARY

An exemplary system for granting or inhibiting access to one or more secure areas, such as drawers of a medical dispensing unit, includes one or more access modules. Each access module includes a circuit for locking (inhibiting access to) and unlocking (granting access to) the corresponding secure area, as well as detecting when the secure area is open, closed, or present. The circuit can include, for example, actuators, switches, etc. corresponding to each secure area. Typically, the access modules are stacked one on top of the other, wherein electrical connections from a first module are provided to a second module, and so on. The system further includes a control module operatively coupled to each circuit of the one or more access modules. The control module receives data signals from the access module circuit and provides control signals to the access module circuit so as to control and/or monitor access to the one or more secure areas (e.g., the control module provides control signals to the actuators based on data obtained from the switches and/or other security related data).

The system and/or control module includes a control circuit for controlling a plurality of access modules. The circuit enables physically identical access modules to selectively control access to different secure areas with little or no setup to distinguish between access modules. Further, the circuit enables a signal polarity applied to an actuator utilized in the system (e.g., a solenoid) to be reversed as required.

Each access module can include a user interface device, such as a liquid crystal display or other user interface device. The user interface device can provide information to the user regarding the state of the system, the contents of the secure area, etc. Additionally, each access module can include a plurality of outputs for controlling various devices associated with the access module and/or secure area, and a plurality of inputs for obtaining information regarding the access module and/or secure area. The user interface, inputs and outputs can be communicatively coupled to the control module via any one of several communication circuits.

According to one aspect of the invention, a system for selectively controlling access to a plurality of secure areas includes: a plurality of actuators each operative to grant or deny access to a corresponding one of the plurality of secure areas; a plurality of access modules each assigned to at least one secure area of the plurality of secure areas; a driver circuit including a plurality of drivers for driving a load, wherein at least one of the plurality of drivers is operatively coupled to an actuator corresponding to an access module's secure area, and wherein unused drivers provided to a first access module of the plurality of access modules are output in a cascaded configuration to a second access module of the plurality of access modules According to one aspect of the invention, each actuator of the plurality of actuators is operatively coupled to two drivers of the plurality of drivers.

According to one aspect of the invention, a first driver of the plurality of drivers is operatively coupled to a first terminal of a plurality of actuators, and a second driver of the plurality of drivers is operatively coupled to a second terminal of only one actuator of the plurality of actuators.

According to one aspect of the invention, the driver circuit is operative to reverse polarity of a signal provided to an actuator of the plurality of actuators.

According to one aspect of the invention, at least one driver of the plurality of drivers is operative to be driven high, low or off.

According to one aspect of the invention, a single driver of the plurality of drivers is operatively coupled to a first terminal of each of the plurality of actuators.

According to one aspect of the invention, a single driver of the plurality of drivers is operatively coupled to a second terminal of one of the plurality of actuators.

According to one aspect of the invention, the system is a medication dispensing unit.

According to one aspect of the invention, the system further includes a control module operatively coupled to the driver circuit, said control module configured to operate the plurality of drivers so as to selectively control access to the plurality of secure areas.

According to one aspect of the invention, at least one access module of the plurality of access modules is operative to detect a state of the corresponding secure area.

According to one aspect of the invention, the possible states of the secure areas are open, closed, present or locked.

According to one aspect of the invention, the system further includes a plurality of switches each corresponding to one of the plurality of secure areas, each switch operative to provide information corresponding to a state of the respective secure area.

According to one aspect of the invention, the system further includes an input circuit operatively coupled to each of the plurality of access modules, said input circuit including i) a plurality of pull-up drivers operatively coupled to a first terminal of only one of the plurality of switches, and ii) a common input for coupling to a second terminal of each of the plurality of switches, wherein each access module is configured such that unused pull-up drivers provided to a first access module of the plurality of access modules are cascaded to a second access module of the plurality of access modules.

According to one aspect of the invention, the plurality of access modules are physically identical to one another.

According to one aspect of the invention, the system further includes a plurality of locking mechanisms, wherein each of the plurality of locking mechanisms is operatively coupled to a corresponding one of the plurality of actuators.

According to one aspect of the invention, a system for selectively controlling access to a plurality of secure areas includes: a plurality of loads each corresponding to a state of access to a corresponding one of the plurality of secure areas; a plurality of access modules each assigned to at least one secure area of the plurality of secure areas; and a driver circuit including a plurality of drivers, wherein at least one of the plurality of drivers is operatively coupled to an actuator corresponding to an access module's secure area, and wherein unused drivers provided to a first access module of the plurality of access modules are output in a cascaded configuration to a second access module of the plurality of access modules.

According to one aspect of the invention, the load is an actuator or a status indicator.

According to one aspect of the invention, an access module for use in a system for selectively controlling access to a plurality of secure areas, said system including a) a plurality of loads each corresponding to a state of access to a corresponding one of the plurality of secure areas, and b) a driver circuit including a plurality of drivers, wherein the access module corresponds to at least one secure area of the plurality of secure areas, the access module including: a plurality of inputs configured to receive signals from the plurality of driver circuits; a first plurality of outputs operatively coupled to at least some of the plurality of inputs, wherein the first plurality of outputs are configured to communicate the signals to actuators corresponding to the access module's secure area; and a second plurality of outputs operatively coupled to others of the plurality of inputs, wherein the second plurality of outputs provide a cascaded output of the others of the plurality of inputs.

According to one aspect of the invention, an access module is provided for use in a system for selectively controlling access to a plurality of secure areas, the system including a) a plurality of downlink serial data streams carrying user interface data from a control module to user output devices (e.g., alphanumeric and/or graphic displays, indicator lamps) either in the access module or in each of the access module's secure areas, and b) an uplink serial data stream carrying user interface data from user input devices (e.g., pushbuttons, key switches, touch pads, trackballs) either in the access module or in each of the access module's secure areas to the control module, wherein the access module corresponds to at least one secure area of the plurality of secure areas, the access module including: a plurality of downlink serial data stream inputs and a plurality of data stream outputs; a first plurality of data stream inputs operatively coupled to the user output devices (perhaps via a microcontroller); a second plurality of data stream inputs operatively coupled to others of the plurality of data stream inputs, wherein the second plurality of data stream outputs provides a cascaded output to the others of the plurality of data stream inputs; and a common data stream output connected to the user input devices (perhaps via a microcontroller).

According to one aspect of the invention, an access module is provided for use in a system for selectively controlling access to a plurality of secure areas, said system including a) a plurality of device select signals, b) a serial clock signal, c) a downlink serial data stream carrying user interface data from the control module to user output devices (e.g., alphanumeric and/or graphic displays, indicator lamps) either in the access module or in each of the access module's secure areas, and d) an uplink serial data stream carrying user interface data from user input devices (e.g., pushbuttons, key switches, touch pads, trackballs) either in the access module or in each of the access module's secure areas to the control module, wherein the access module corresponds to at least one secure area of the plurality of secure areas, the access module including: a plurality of device select signal inputs and a plurality of device select outputs; a first plurality of device select inputs operatively coupled to enable data transmission to the user output device and from the user input devices s (perhaps via a microcontroller); a second plurality of device select inputs operatively coupled to others of the plurality of device select inputs, wherein the second plurality of device select outputs provides a cascaded output to the others of the plurality of device select inputs; and serial clock, downlink serial data stream, and uplink serial data stream signals to perform the uplink and downlink data transfers.

According to one aspect of the invention, an access module is provided for use in a system for selectively controlling access to a plurality of secure areas, the system including a) a plurality of serial clock signals, b) a device select signal, c) a downlink serial data stream carrying user interface data from the control module to user output devices (e.g., alphanumeric and/or graphic displays, indicator lamps) either in the access module or in each of the access module's secure areas, and d) an uplink serial data stream carrying user interface data from user input devices (e.g., pushbuttons, key switches, touch pads, trackballs) either in the access module or in each of the access module's secure areas to the control module, wherein the access module corresponds to at least one secure area of the plurality of secure areas, the access module including: a plurality of serial clock signal inputs and a plurality of serial clock outputs; a first plurality of serial clock inputs operatively coupled to clock data transmission to the user output devices and from the user input devices (perhaps via a microcontroller); a second plurality of serial clock inputs operatively coupled to others of the plurality of serial clock inputs, wherein the second plurality of serial clock outputs provides a cascaded output to the others of the plurality of serial clock inputs; and device select, downlink serial data stream, and uplink serial data stream signals to perform the uplink and downlink data transfers.

According to one aspect of the invention, an access module is provided for use in a system for selectively controlling access to a plurality of secure areas, said system including a) a plurality of serial clock signals, and b) a plurality of bidirectional serial data stream carrying user interface data from the control module to user output devices (e.g., to alphanumeric and/or graphic displays, indicator lamps) either in the access module or in each of the access module's secure areas and carrying user interface data from user input devices (e.g., pushbuttons, key switches, touch pads, trackballs) either in the access module or in each of the access module's secure areas to the control module, wherein the access module corresponds to at least one secure area of the plurality of secure areas, the access module including: a plurality of serial clock signal inputs and a plurality of serial clock outputs; a first plurality of serial clock inputs operatively coupled to clock data transmission to the user output devices and from the user input devices (perhaps via a microcontroller); a second plurality of serial clock inputs operatively coupled to others of the plurality of serial clock inputs, wherein the second plurality of serial clock outputs provides a cascaded output to the others of the plurality of serial clock inputs; and a plurality of serial data inputs and a plurality of serial data outputs; a first plurality of serial data inputs operatively coupled to provide bidirectional data transfer to the user output devices and from the user input devices (perhaps via a microcontroller); a second plurality of serial data inputs operatively coupled to others of the plurality of serial data inputs, wherein the second plurality of serial data outputs provides a cascaded output to the others of the plurality of serial data inputs.

According to one aspect of the invention, there is provided a dispensing system for selectively controlling access to a plurality of secure areas. The system includes: a control module including a first communication device for communicating control data generated by said control module, said first communication device including a plurality of communication channels each assigned to a corresponding one of the plurality of secure areas; and a plurality of access modules each assigned to a corresponding one of the plurality of secure areas, each access module of the plurality of access modules including a plurality of inputs corresponding to the plurality of communication channels, wherein each access module enables or inhibits access to the corresponding secure area based on the control data from the control module as provided on at least one of the inputs, and wherein unused inputs within each access module are output in a cascaded configuration.

According to one aspect of the invention, each access module includes access logic communicatively coupled to at least one input of the said plurality of inputs to receive said control data, said access logic configured to grant or deny access to the corresponding to secure area based on said control data.

According to one aspect of the invention, the control module comprises control logic configured to generate the control data for selectively controlling access to each of the plurality of secure areas, and the first communication device is communicatively coupled to the control logic for receiving said control data.

According to one aspect of the invention, the control logic and the access logic comprise a serial peripheral interface.

According to one aspect of the invention, the control logic and the access logic comprise a universal asynchronous receiver-transmitter (UART).

According to one aspect of the invention, the control logic and the access logic comprise an inter-integrated circuit (12C) configuration.

According to one aspect of the invention, the access logic includes a processor and memory, and computer executable instructions stored in memory, wherein when executed by said processor, cause the processor to grant or deny access to the corresponding secure area based on said control data.

According to one aspect of the invention, at least one access module includes at least one of a) a display device, b) a control input for receiving data concerning the corresponding secure area, or c) a control output for providing data concerning the corresponding secure area, said at least one of the display device, control input or control output operatively coupled to said access logic.

According to one aspect of the invention, the display device is at least one of a liquid crystal display device or a light emitting diode display device.

According to one aspect of the invention, at least one access module comprises a switch corresponding to the secure area and communicatively coupled to the access logic, the switch operative to provide information corresponding to a state of the respective secure area.

According to one aspect of the invention, the system further includes: a plurality of actuators each operative to grant or deny access to a corresponding one of the plurality of secure areas; a driver circuit including a plurality of drivers for driving a load, wherein at least one driver of the plurality of drivers is operatively coupled to an actuator corresponding to an access module's secure area, and wherein the at least one driver is operatively coupled to the access logic.

According to one aspect of the invention, the system is a medication dispensing unit.

According to one aspect of the invention, at least one access module of the plurality of access modules is operative to detect a state of the corresponding secure area, and to communicate the detected state to the control module.

According to one aspect of the invention, the plurality of access modules are physically identical to one another.

According to one aspect of the invention, the plurality of access modules are arranged in a stacked configuration.

According to one aspect of the invention, an access module for use in a system for selectively controlling access to a corresponding secure area includes: a plurality of inputs for receiving control data; access logic communicatively coupled to at least one input of the plurality of inputs, said access logic configured to enable or inhibit access to the corresponding secure area based on the control data, wherein the plurality of inputs are arranged such that unused inputs are output in a cascaded configuration.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in to combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
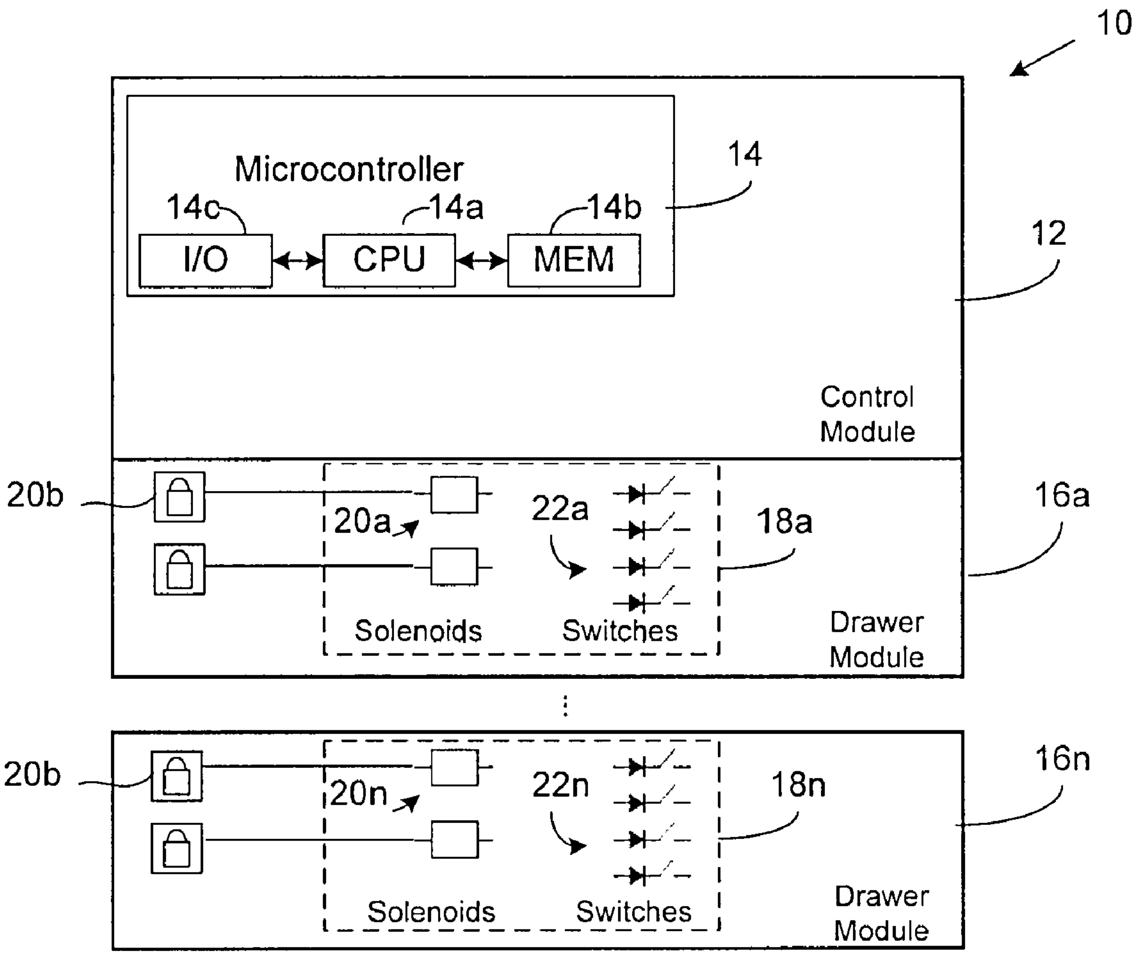
FIG. 1 is a schematic diagram of an exemplary drawer system.

Embodiments of the present invention will now be described with reference to the drawings, wherein like reference numerals are used to refer to like elements throughout. It will be understood that the figures are not necessarily to scale.

In the present application, embodiments of the invention are described primarily in the context of a medical dispensing system. However, it will be appreciated that the invention is not intended to be limited to a medical dispensing system and may relate to any type of security system in which access to a particular area is to be monitored and/or restricted.

Referring to FIG. 1, there is shown an exemplary drawer system 10 for dispensing medications in a hospital environment. The drawer system 10 includes a control module 12 for monitoring and controlling operation of the drawer system 10. The control module 12 includes a microcontroller 14, which can include a processor 14*a*, memory 14*b*, and input/output (I/O) module 14*c*. The memory 14*b* can include both volatile memory and non-volatile memory as is conventional. Stored in memory 14*b* is logic that when executed by the processor 14*a* causes the I/O module 14*c* to provide commands to a drawer module (discussed below) that grant or deny access to drawers of the drawer system 10.

With continued reference to FIG. 1, the drawer system 10 also includes one or more drawer modules 16*a*-16*n* (also referred to as access modules). Each drawer module 16*a*-16*n* includes a corresponding circuit 18*a*-18*n* configured to interface with a corresponding drawer (not shown) of the drawer system 10. The circuits 18*a*-18*n* can include one or more actuators $\mathbf{20}a_i$-$\mathbf{20}n_i$ (e.g., solenoids, etc.) corresponding to the drawer and operative to grant or deny access to the drawer, and one or more switches $\mathbf{22}a_i$-$\mathbf{22}n_i$ (e.g., electromechanical or optical switches) for detecting a state (e.g., open, closed, present, locked, etc.) of the corresponding drawer. As used herein, the "open state" refers to a drawer that is not completely closed, "closed state" refers to a drawer that is not open (including not partially open), "present state" refers to a drawer being physically present in the system, and "locked state" refers to a drawer that is in the "closed state" and unable to be opened. Each actuator $\mathbf{20}a_i$-$\mathbf{20}n_i$, is operatively coupled to a locking mechanism 20*b* corresponding to each drawer, wherein the locking mechanism can lock the drawer in the closed position (i.e., deny access to the drawer) or unlock the drawer (i.e., grant access to the drawer). The locking mechanism may be any conventional locking mechanism known in the art. Further, each switch $\mathbf{22}a_i$-$\mathbf{22}n_i$ is operatively coupled to a corresponding drawer or drawer receptacle (which contains the drawer) so as to detect when the drawer is open, closed, or present. The actuators $\mathbf{20}a_1$-$\mathbf{20}n_i$ and switches $\mathbf{22}a_i$-$\mathbf{22}n_i$ of the circuits 18*a*-18*n* are operatively coupled to the control module 12 via the I/O module 14*c* so as to enable the control module 12 to lock or unlock drawers and to detect the state of the drawers.

In operation, the control module 12, based on certain criteria (e.g., authorized identification such as a password or identification badge), may unlock a drawer so that it may be opened. This can be accomplished, for example, by the control module 12 commanding the actuator corresponding to the drawer in which access will be granted to enable or disable the corresponding locking mechanism. For example, when an unlock command is provided to the actuator $\mathbf{20}a_1$, the actuator can act on the locking mechanism corresponding to the drawer so as to disable the lock, thereby enabling the drawer to be opened. Additionally, the control module 12 can monitor the state of the switches $\mathbf{20}a_i$, so as to determine a state of the corresponding drawer. This can be used, for example, to ensure only one drawer is unlocked at a particular moment in time (e.g., if a drawer is opened, another drawer will not be unlocked until all drawers are first closed).

Figure 2:
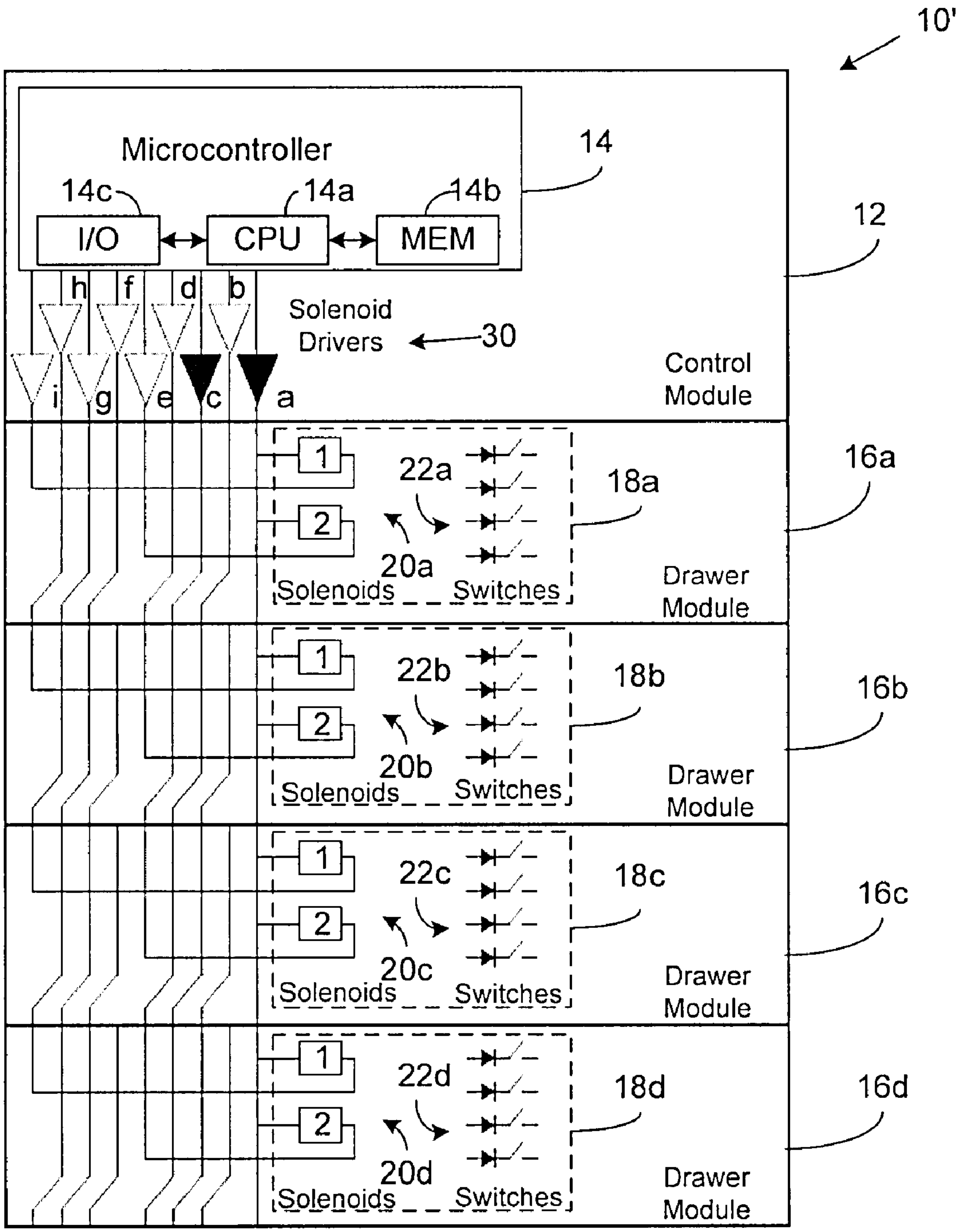
FIG. 2 is a schematic diagram of the drawer system of FIG. 1 and further including an exemplary driver circuit in accordance with the invention.

Moving now to FIG. 2, there is shown a drawer system 10' which is similar to the drawer system 10 of FIG. 1. The drawer system 10' includes all of the features of the drawer system 10. However, the control module 12' further includes an exemplary driver circuit 30 in accordance with the invention. The configuration of the driver circuit 30 and drawer modules 16*a*-16*n* enables identical drawer modules 16*a*-16*n* to be selectively controlled so as to grant or deny access to a particular drawer, without requiring specific setup or configuration of the drawers or drawer modules 16*a*-16*n*.

The driver circuit 30 includes a plurality of drivers 30*a*-30*n*, each of which can be driven high, low or turned off based on commands from the microcontroller 14. One driver 30*a* can be operatively coupled to one side of each actuator $\mathbf{20}a_i$-$\mathbf{20}n_i$ of the drawer system 10'. The remaining drivers 30*b*-30*i* then are each operatively coupled to a single actuator, such that each actuator $\mathbf{20}a_i$-$\mathbf{20}n_i$ is associated with two drivers. In this configuration, the two drivers corresponding to a single actuator can function as a full-bridge driver to apply voltage in either polarity to the actuator.

For example, if the actuators $\mathbf{20}a_i$-$\mathbf{20}n_i$ are solenoids and it is desired to activate solenoid $\mathbf{20}c_2$, then the microcontroller 14 can command the drivers 30*a* and 30*c* of the driver circuit 30 to apply a voltage having a positive polarity to solenoid $\mathbf{20}c_2$ (i.e., where a positive polarity refers to providing a positive voltage to the left side of the solenoid). This can be accomplished, for example, by enabling drivers 30*a* (coupled to the left side of all solenoids) and 30*c* (coupled the right side of solenoid $\mathbf{20}c_2$), wherein driver 30*a* is set to apply a positive voltage and driver 30*c* is set to apply a negative voltage or zero volts (e.g. coupled to common).

If it is desired to reverse the polarity of the voltage applied to the solenoid (i.e., provide a negative voltage to the left side of the solenoid and a positive voltage to the right side of the solenoid), then the microcontroller 14 enables the same two driver circuits 30*a* and 30*c*, wherein driver 30*c* is set to apply a positive voltage and driver 30*a* is set to provide a negative voltage or zero volts. The solenoid 20$a_1$ may be de-energized by turning off at least one driver 30*a* and 30*c*.

As is evident from FIG. 2, the driver outputs are connected to the various actuators 20$a_i$-20$n_i$ in an interesting way. In the exemplary implementation of FIG. 2, a single common driver (i.e., driver 30*a*) drives one end of all solenoid coils. The other end of each solenoid coil is driven by a dedicated driver. The microcontroller 14 drives a particular solenoid coil by turning on the two drivers corresponding to the particular solenoid.

Further, it is noted that the top-most drawer module 16*a* picks off two driver outputs corresponding to the right side actuator connection (drivers 30*e* and 30*i*) and forwards the other driver outputs to the next drawer module so as to down shift or cascade them over one position. Thus, the second drawer module 16*b* in the stack picks off a different two driver outputs (drivers 30*d* and 30*h*) for the right side of its actuators 20$b_1$ and 20$b_2$ even though it is physically identical to the top drawer module 16*a*.

Figure 3:
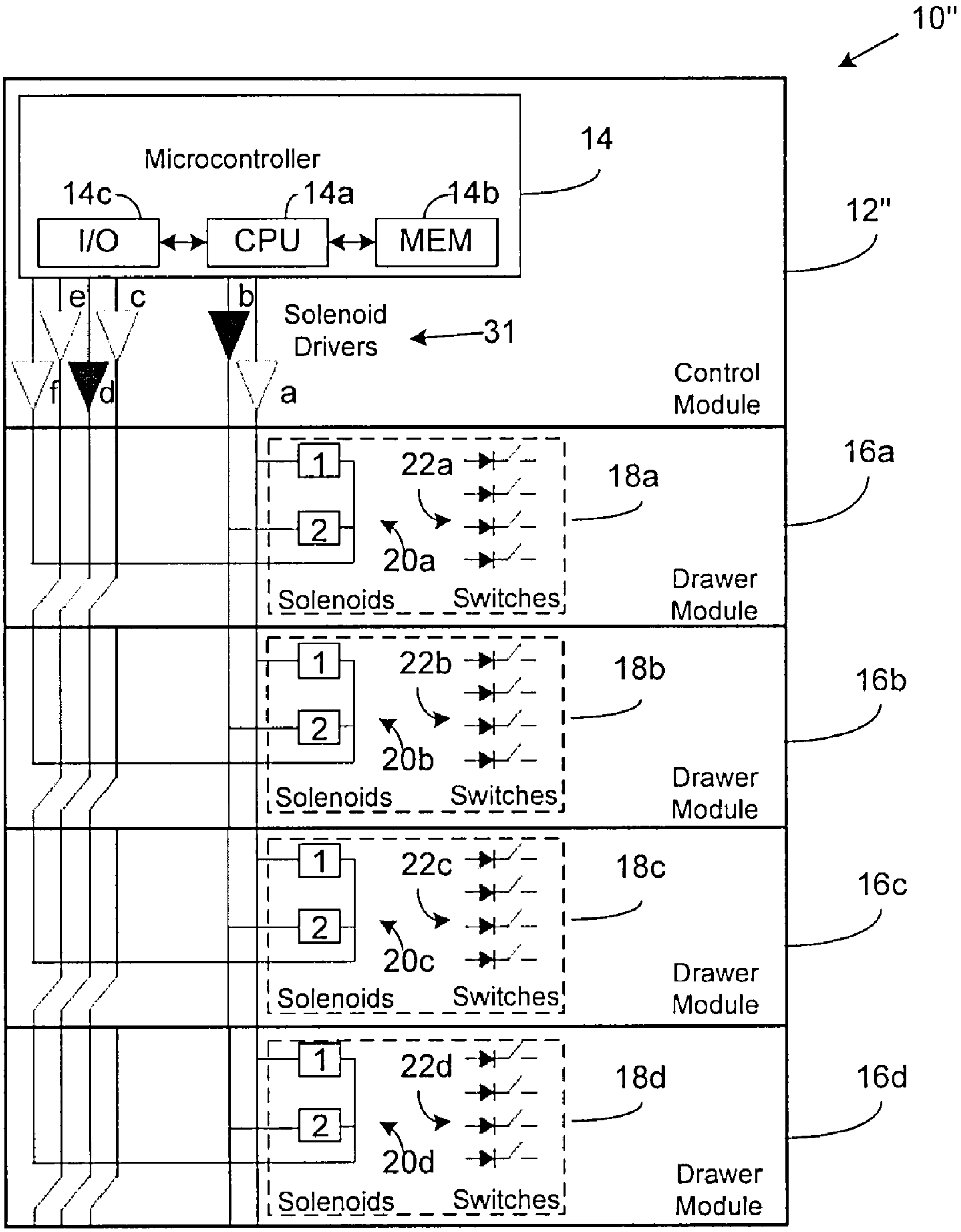
FIG. 3 is a schematic diagram of the drawer system of FIG. 1 and further including another exemplary driver circuit in accordance with the invention.

Other configurations of the driver circuit 30 are possible. For example, and with reference to FIG. 3, a driver circuit 31 could include a common left-end driver 31*a* for each of the upper actuators 20$a_1$, 20$b_1$, 20$c_1$ and 20$d_1$, and another common left-end driver 31*b* for each of the lower actuators 20$a_2$, 20$b_2$, 20$c_2$ and 20$d_2$. Then, only four cascading right-end driver outputs 31*c*-31*f* are needed for a four-drawer system as shown in FIG. 3.

As used herein, cascading the driver outputs is defined as using one (or more) of the drivers for a receiving drawer module (e.g., a first drawer module) and then shifting or staggering the remaining drivers of the first drawer module as they are passed to the next drawer module (e.g., the driver coupled to a first driver input of the first drawer module is used within the first drawer module, and the drivers coupled to second, third, fourth, etc. inputs of the first drawer module are provided to the next drawer module (e.g., second drawer module), wherein the second, third, fourth, etc. driver inputs of the first drawer module are coupled to first, second, third, etc. driver inputs, respectively, of the second drawer module).

For example, if the control module includes three drivers having terminals or connection points arranged sequentially (e.g., the connections from the control module are arranged as driver 1, driver 2 and driver 3 from left to right), and three drawer modules are to be stacked one on the other, then the three driver connections from the control module are all provided to a first drawer module as first, second and third driver inputs. The first drawer module uses the first driver input (driver 1 or a left-most driver connection) for its actuators, and passes the second and third driver inputs to the second drawer module (e.g., the next drawer module in the stack), wherein the second and third driver inputs of the first drawer module are coupled to the first and second driver inputs of the second drawer module. The second drawer module then uses the first driver input (originally driver connection 2 as provided to the first drawer module) for its actuators, and passes the to second driver input connection (originally driver connection 3) to the third drawer module (again, the next drawer module in the stack). The second driver input provided to the second drawer module becomes the first driver input to the third drawer module.

Preferably, there is at least one common driver that is coupled to an actuator in a number of drawer modules. For example, in a three drawer system wherein each drawer has one actuator, one driver is coupled to a first connector of each actuator. Then, three additional drivers are coupled to second connectors, respectively, of each actuator (e.g., for three actuators, four drivers are used). In this manner, the signal polarity provided to each actuator may be reversed.

More drawers can be added to either system 10 and 10' of FIGS. 2 and 3 by adding more cascading right-side driver outputs. Other loads such as LEDs also can be added to the array of solenoid loads and selectively driven in the same way that the solenoid coils are driven.

Also, since the common driver and the particular driver form a full-bridge driver, the positive voltage applied to the solenoid coil does not have to be the same magnitude as the negative voltage. The microcontroller 14 can reduce the applied voltage by modulating the duty cycle of one of the two drivers using a technique such as pulse-width modulation. This is particularly useful with magnetically biased latching solenoids since such solenoids have different magnitude and opposite polarity pull-in and release voltages.

Figure 4:
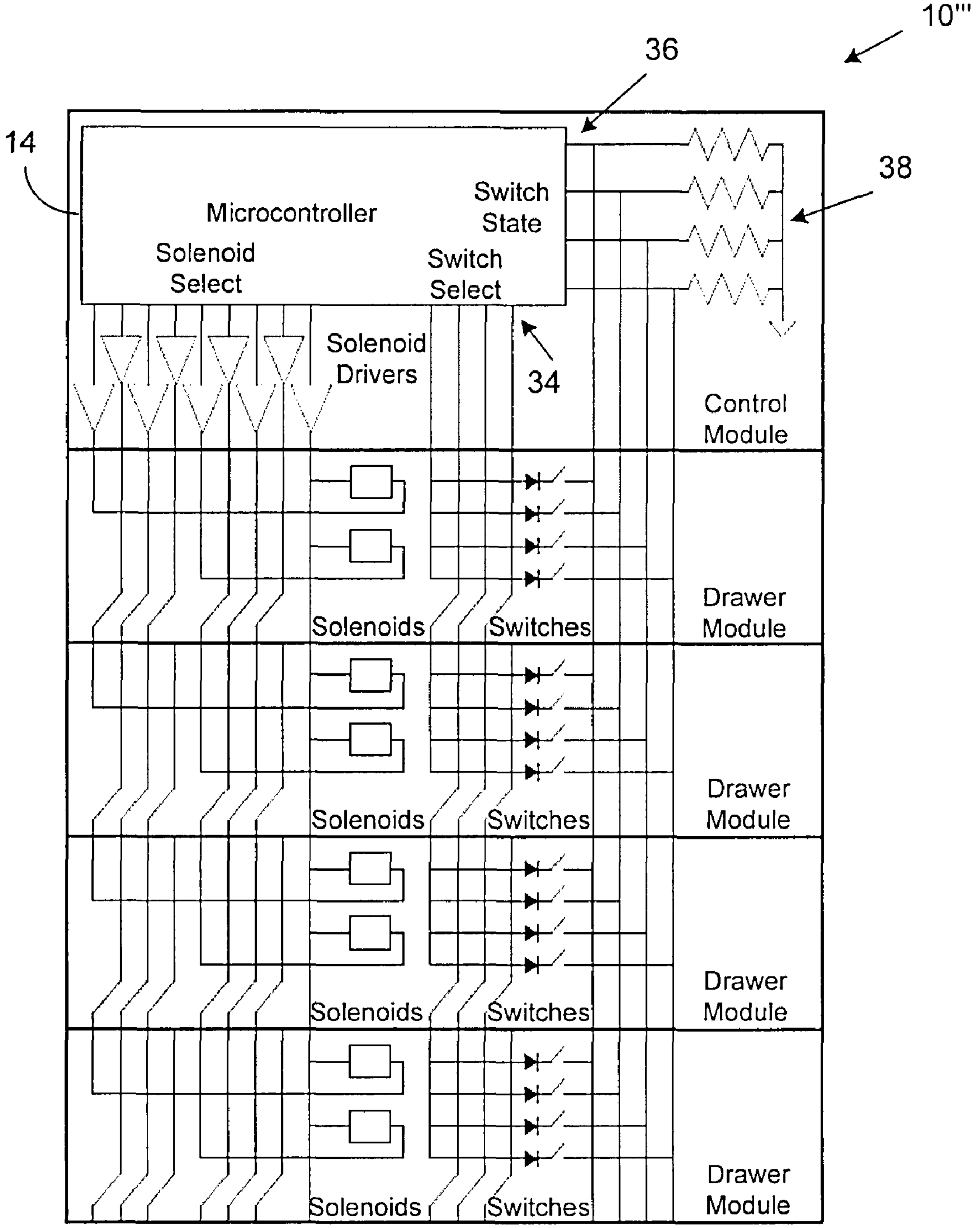
FIG. 4 is a schematic diagram of an exemplary drawer system with an exemplary switch pull-up circuit in accordance with the invention.

The switches 22$a_i$-22$n_i$ can be interrogated with a circuit very similar to the solenoid drive circuits 30 and 31. For example, and with reference to FIG. 4, a system 10''' that includes a plurality of pull-up drivers 34 can be connected in a cascaded fashion. Each driver pulls up on one end of each of the switches 22$a_i$-22$n_i$ in a particular drawer module. The other ends of the switches 22$a_i$-22$n_i$ can be connected to a plurality of common lines 36 that return to the microcontroller 14 where they are pulled down with resistors 38. The microcontroller 14 can interrogate the switches 22$a_i$-22$n_i$ in a particular drawer module by turning on the corresponding pull-up driver. The microcontroller 14 then reads the common lines 36. A high logic level indicates a closed switch and a low logic level indicates an open switch.

Again, the microcontroller pull-up drivers 34 select the various drawer modules even though the drawer modules themselves are identical due to the cascaded connection of the pull-up driver outputs. Additional switches can be added to each drawer module by adding pulled-down common lines and one can add drawer modules by adding cascaded pull-up driver lines.

If one of the switches in the drawer module is replaced by a fixed connection, the drawer module's presence or absence can be determined by the microcontroller 14. If the connection is closed, the drawer module is present, but if the connection is open, the drawer module is absent. This feature allows the microcontroller 14 to determine how many drawers are stacked underneath it without user intervention. Other switches can be replaced by fixed connections to allow the microcontroller to differentiate between different types of drawer modules.

Accordingly, an apparatus that enables physically identical drawer modules to be selectively driven by a control module has been disclosed. Driver leads and switch pull-up driver leads allows the physically identical drawer modules to be selectively driven by the microcontroller in the control module. Moreover, the microcontroller can readily distinguish one drawer module from another drawer module with little or no setup. Further, the apparatus can reverse polarity of control signals provided to the actuators (e.g., solenoids, etc.) of the access module.

Figure 5:
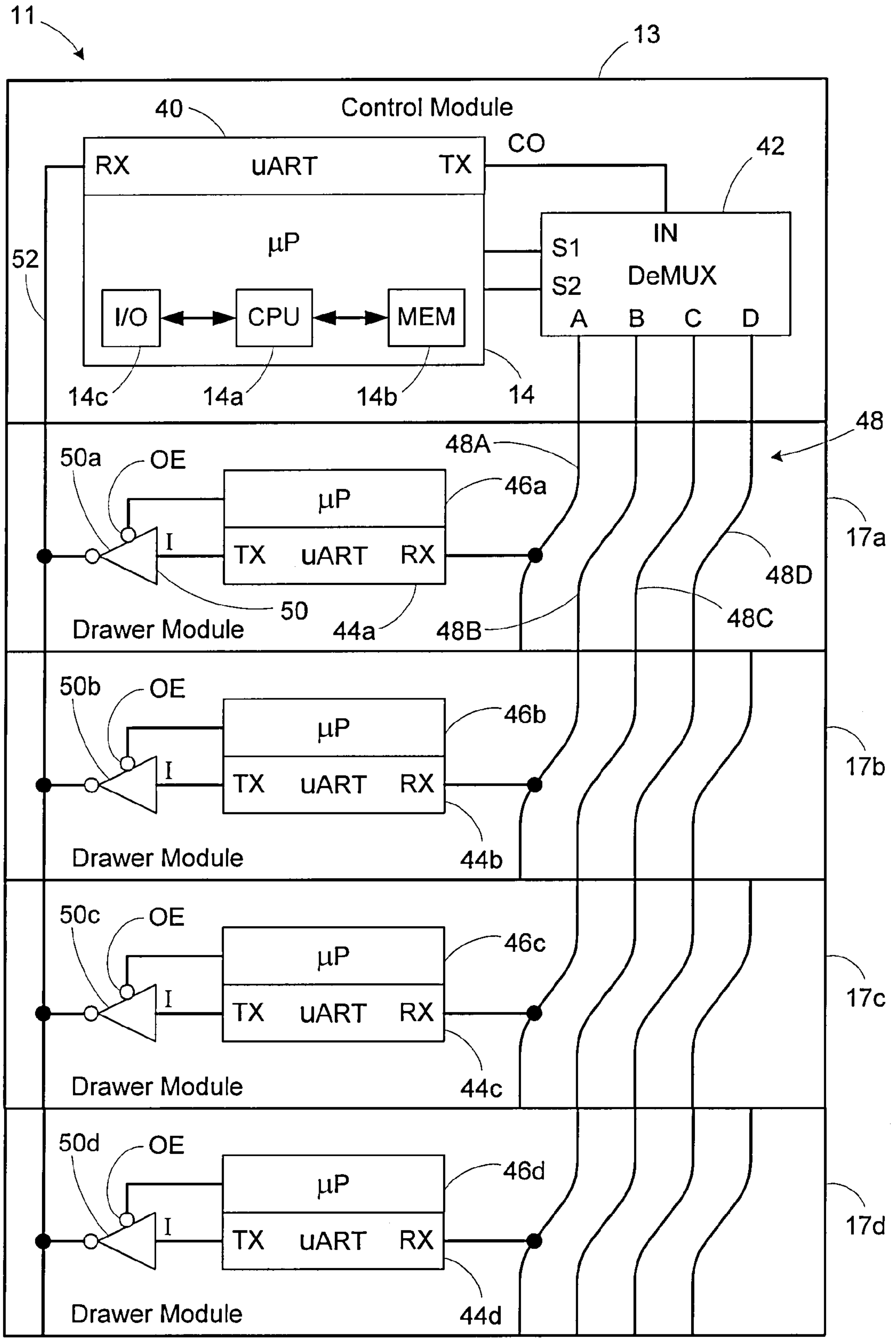
FIG. 5 is a schematic diagram of an exemplary drawer system in accordance with another embodiment of the invention, wherein the drawer system includes a communication circuit that utilizes UARTS to exchange data between the control module and access modules.

Moving now to FIG. 5, there is shown an exemplary drawer system 11 in accordance with another embodiment of the invention. The drawer system 11 includes a control module 13 having a microcontroller 14 (e.g., a processor or the like) as described herein. Communicatively coupled to the microcontroller 14 is a universal asynchronous receiver-transmitter (UART) 40. The UART 40 includes a receive input Rx and a transmit output Tx as is conventional. The receive input Rx is coupled to a first terminal (not shown) of the control module 13, and the transmit output Tx is coupled to an input IN of demultiplexor 42. The demultiplexor 42 includes a plurality of outputs A, B, C and D, each coupled to a corresponding terminal (not shown) of the control module, and a plurality select inputs S1 and S2 for selecting which of the plurality of outputs A, B, C, or D is coupled to the input IN. The select inputs S1 and S2 are coupled to the microcontroller 14 so as to enable the microcontroller 14 to select which drawer module will be coupled to the control module's UART's transmit output Tx. The UART 40 and demultiplexor 42 form an exemplary first communication device, wherein each output A, B, C and D of the demultiplexor 42 corresponds to one secure area. Although only four outputs are shown, it will be appreciated that any number of outputs can be incorporated in the control module 13 by adding additional demultiplexors and/or using demultiplexors having a greater number of outputs, for example.

The drawer system 11 also includes a plurality of drawer modules 17*a*-17*d* (also referred to as access modules) assigned to a corresponding secure area, wherein each drawer module 17*a*-17*d* includes a UART 44*a*-44*d* having a receive input Rx and a transmit output Tx. Additionally, each UART 44*a*-44*d* is communicatively coupled to a corresponding processor 46*a*-46*d* of the drawer module 17*a*-17*d*. Each drawer module 17*a*-17*d* also includes a plurality of inputs 48A-48D (collectively referred as inputs 48) coupled to terminals (not shown) of the drawer module. At least one of the plurality of inputs (e.g., input 48A) is coupled to the drawer module's UART via the UART's receive input Rx, and unused inputs 48B-48D are output from each drawer module 17*a*-17*d* in a cascaded configuration (e.g., the second input 48B of drawer module 17*a* becomes the first input for drawer module 17*b*, and so on). The transmit output Tx of each UART 44*a*-44*d* is coupled to input I of corresponding tri-state buffer 50*a*-50*d*, and an output 0 of each tri-state buffer 50*a*-50*d*, via a terminal (not shown), is coupled to return line 52 (which is coupled to the receive input Rx of the control module's UART 40). The output enable OE of each tri-state buffer 50*a*-50*d* is coupled to the respective drawer module's processor 46*a*-46*d*, which controls when the drawer module's UART will be coupled to the return line 52 (and thus to the control module 13).

In operation, the microcontroller 14 of control module 13, via control logic, generates control data for controlling the respective drawer modules 17*a*-17*d*. The control logic can include, for example, hardware and/or software configured to control the drawer system (e.g., computer code stored in memory and executed by the processor, dedicated hardware, etc.). The control data may be generated based on various inputs made by a user (e.g., keyboard or mouse inputs), states of the drawer system, etc. as is conventional. The control data generated by the microcontroller 14 is provided to the UART 40, and UART 40, via demultiplexor 42, selectively communicates with a UART of one drawer module. The particular drawer module that is to communicate with the UART 40 is selected by the microcontroller 14 via select inputs S1 and S2 of the demultiplexor 42.

When a particular drawer module 17*a*-17*d* is receiving control data from the control module 13, the drawer module, via access logic, will enable the output enable OE for its respective tri-state buffer 50*a*-50*d*. The access logic can include, for example, hardware and/or software configured to grant/deny access to the secure area and/or collect information regarding the drawer module and/or secure area (e.g., computer code stored in memory and executed by the processor, dedicated hardware, etc.). In this manner, data collected by the drawer module's processor 46*a*-46*d* can be communicated back to the microcontroller 14 of control module 13. The drawer modules are configured such that physically identical drawer modules can be used to selectively control different secure areas, without the need to perform specific configuration for each drawer module.

Each drawer module 17*a*-17*d* may include various devices, inputs, outputs, etc. corresponding to the secure area. For example, each drawer module 17*a*-17*d* may include a display device, such as a liquid crystal display (LCD) device, a light-emitting diode (LED) display device, or the like. These display devices can be communicatively coupled to the processor 46*a*-46*d* of the corresponding drawer model 17*a*-17*d*. In this manner, the microcontroller 14 of the control module may provide area-specific information for each drawer module 17*a*-17*d*, and this information can be provided on the display device of the drawer module. The information may include, for example, whether or not a user has access to secure area, the contents of the secure area, or other information concerning the secure area or the system as a whole. Another possibility is to provide information on the display device that assists a user in locating items stored in the drawers (e.g., the particular drawer that should be accessed, the particular bin within the drawer, the particular container within the bin, etc.) Such information can be based, for example, on patient-specific data (e.g., bar code data or the like on a patient's wrist band or other location in which data may be associated with the patient) and known locations of items within the drawers/bins/containers. For example, patient data may be collected via a scanning device (e.g., a bar code reader or other type of data scanner), and the collected patient data can be to used to determine the patient's prescribed medications (e.g., via a database). Once the medications are determined, their location in the drawer system can be provided on the display panel so as to assist the medical professional in locating the medications. In addition to outputting data, data also may be input to the display device (e.g., via a touch panel), and the input data can be transmitted back to the control module 13 for use by the microcontroller 14.

In addition to a display device, each drawer module 17*a*-17*d* may include a plurality of I/O points for collecting data and/or controlling devices (e.g., actuators, lights, switch inputs, etc.) of the drawer module, wherein the I/O points are operatively coupled to the respective processor 46*a*-46*d*. Since the microcontroller 14 can communicate with each drawer module's processor, the microcontroller 14, via a particular drawer module's processor and outputs, can control actuators and the like of the drawer module. Additionally, the microcontroller 14, via the drawer module's processor and inputs, can receive status information pertaining to the particular drawer module.

For example, the microcontroller 14 may provide control data that instructs a drawer module 17*a* to unlock its corresponding secure area. The drawer module's processor 46*a* receives the control data via input 48A, and based on the data commands an actuator coupled to a control output of the drawer module 17*a* to unlock the secure area. Similarly, status information can be collected by the processor 46*a* of drawer module 17*a* via a status input. The processor 46*a* then can forward the status input data to the microcontroller 14 by enabling the tri-state buffer 50*a*, thereby establishing a communication link back to the microcontroller 14.

Figure 6:
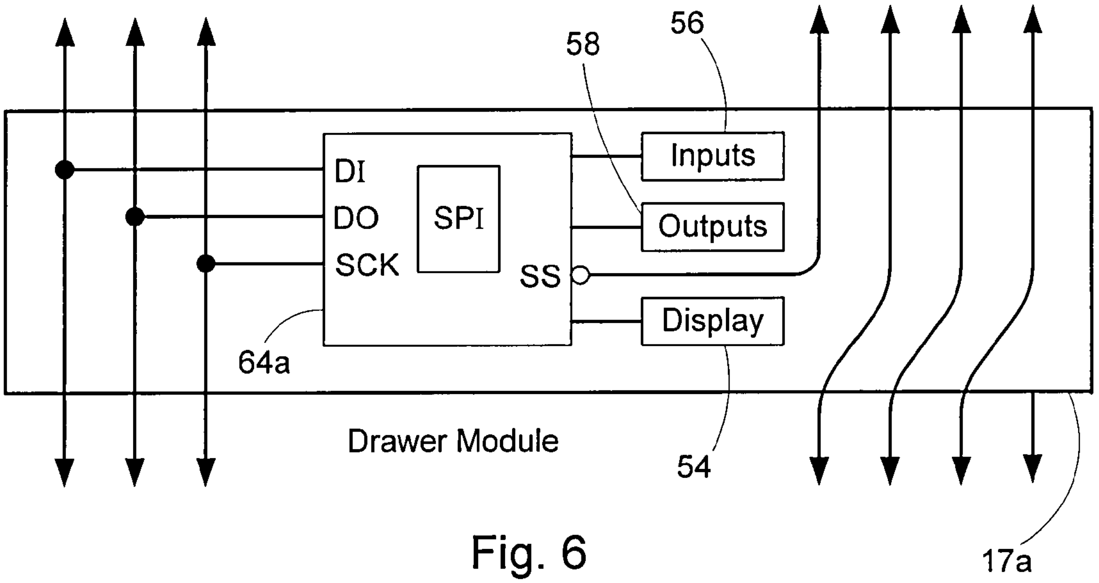
FIG. 6 illustrates an exemplary access module that includes a user interface device, and I/O for controlling and monitoring the access module and/or secure area.

FIG. 6 illustrates an exemplary drawer module having a display device 54, a plurality of status inputs 56 and a plurality of control outputs 58 coupled to the processor 46 of a drawer module. The implementation shown in FIG. 6 utilizes a serial peripheral interface, which is discussed below with respect to FIG. 7).

Figure 7A:
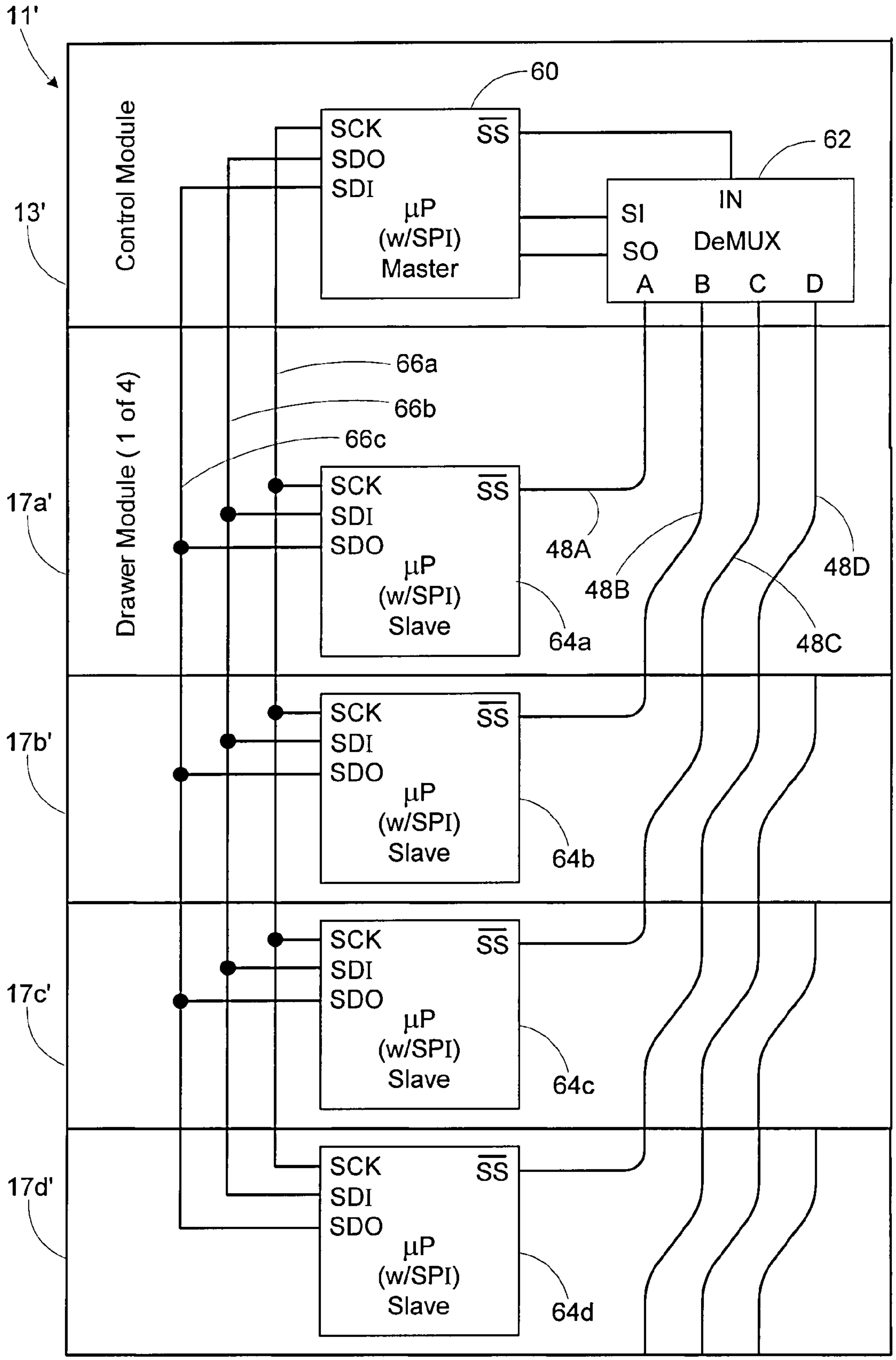
FIG. 7*a* is a schematic diagram of an exemplary drawer system in accordance with another embodiment of the invention, wherein the drawer system utilizes a communication circuit that utilizes serial peripheral interface architecture to exchange data between the control module and the access module.
Figure 7B:
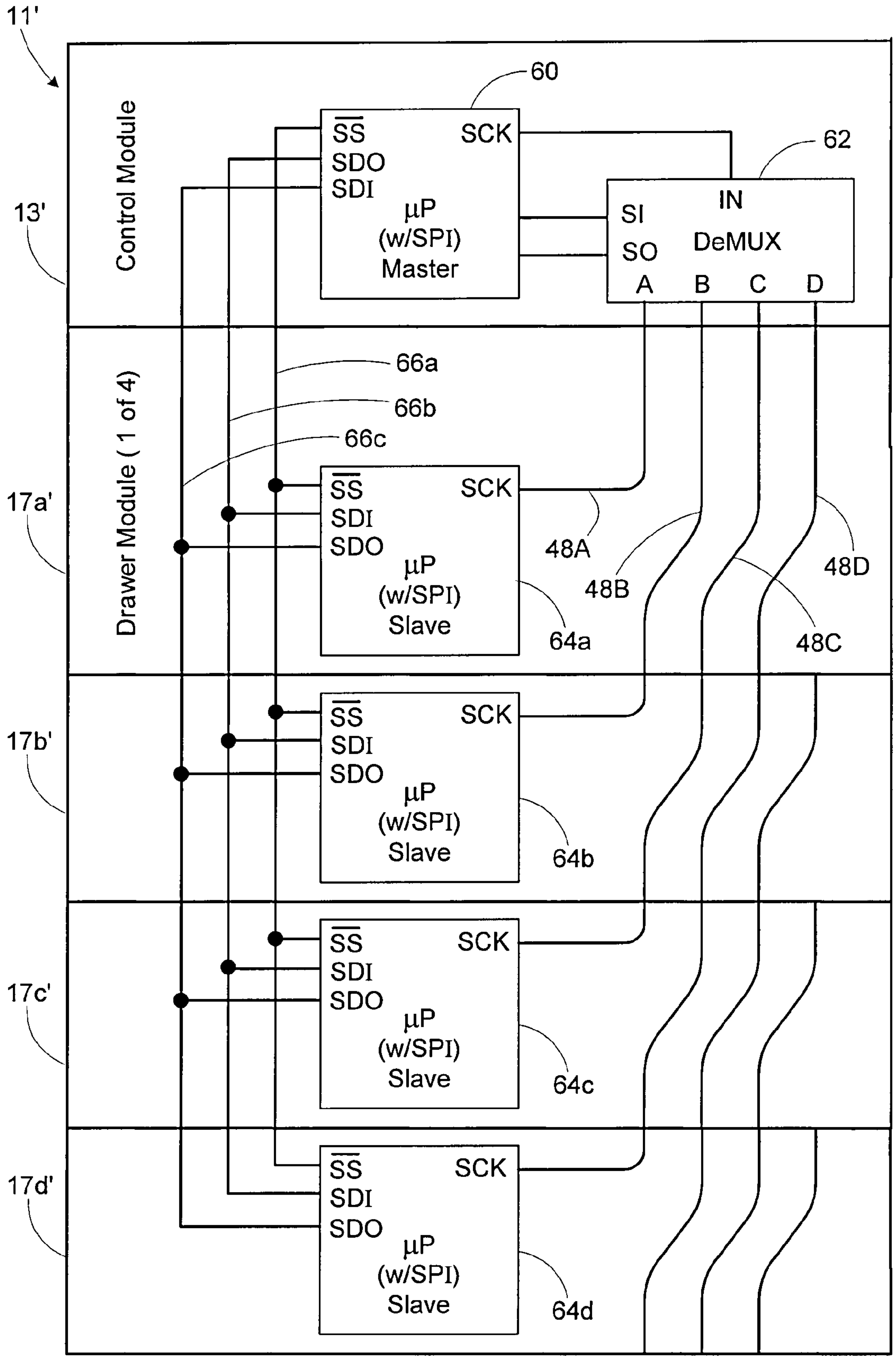
FIG. 7*b* is a schematic diagram of an exemplary drawer system in accordance with another embodiment of the invention, wherein the drawer system utilizes a communication circuit that utilizes serial peripheral interface architecture to exchange data between the control module and the access module.
Figure 8:
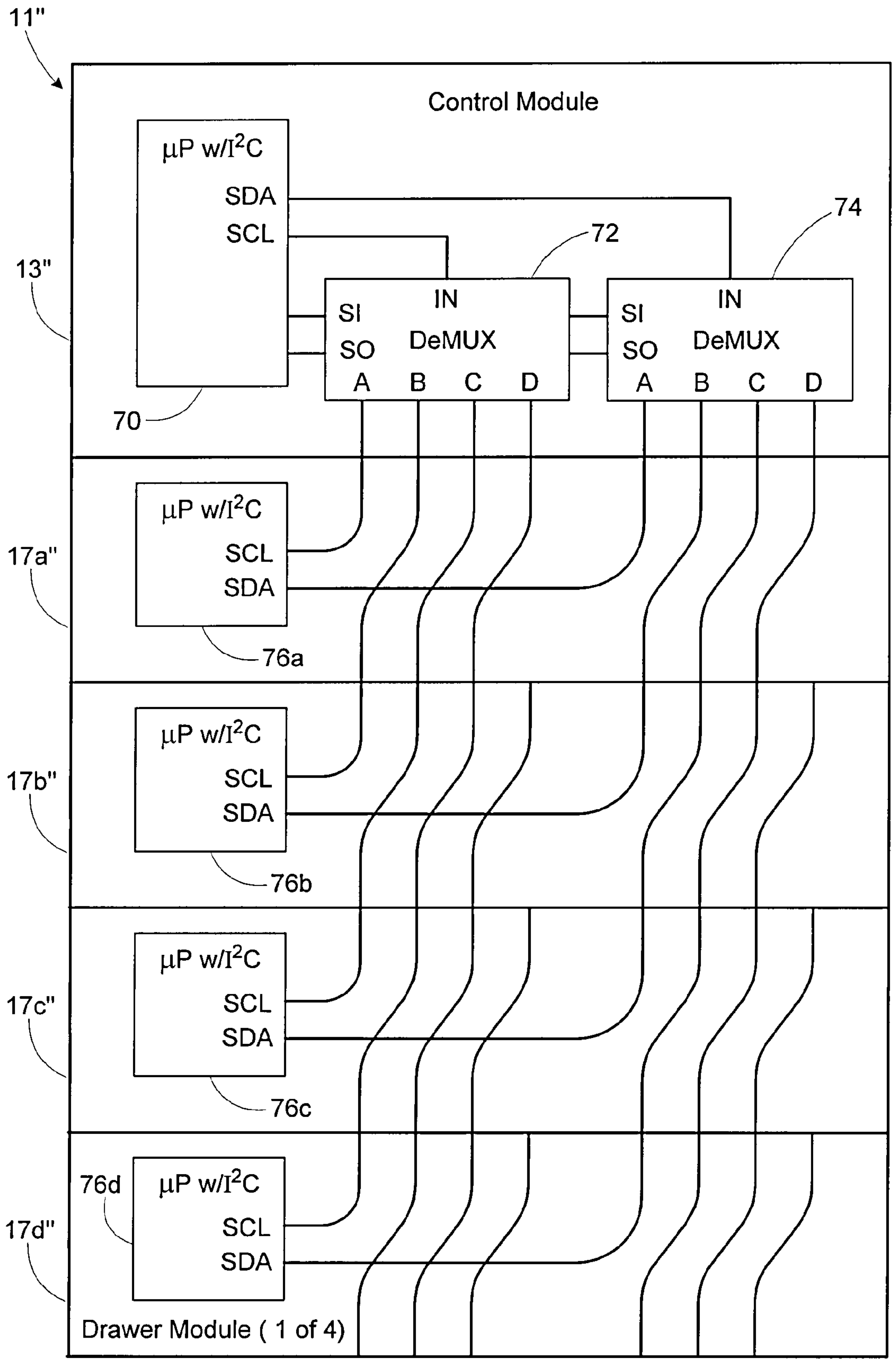
FIG. 8 is a schematic diagram of an exemplary drawer system in accordance with another embodiment of the invention, wherein the drawer system utilizes a communication circuit that utilizes inter-integrated circuit architecture to exchange data between the control module and the access module.

FIGS. 7*a*, 7*b* and 8 illustrate alternative embodiments for establishing communications between the control module and drawer modules. The microcontroller, drawer module inputs, drawer module outputs and drawer module devices may be the same as described with respect to the configuration of FIG. 5. For sake of brevity, these features will not be discussed or shown in FIGS. 7*a*, 7*b* and 8, and focus will be on the particular communication means.

FIG. 7*a* illustrates an embodiment of a control module 13' and drawer modules 17*a*'-17*d*' that utilize a serial peripheral interface (SPI) to communicate with one another. The control module 13' includes processor 60 having an integrated SPI configured as a master, wherein a slave select output of the SPI is coupled to an input IN of demutliplexor 62. The demultiplexor 62 also includes a plurality of outputs A, B, C and D, each coupled to a respective terminal (not shown), and a plurality select inputs S1 and S2. The select inputs 51 and S2 are coupled to the processor 60 such that the processor may select which of the plurality of outputs A, B, C, or D is coupled to the input IN. Serial data in SDI, serial data out SDO and serial clock SCK each are provided to a respective terminal (not shown) of the control module 13'. The SPI of the processor 60 and the demultiplexor 62 form an exemplary first communication device, wherein each output A, B, C and D of the demultiplexor 62 corresponds to one secure area. It is noted that the processor 60 may be in addition to the processor of the microcontroller 14 (not shown in FIG. 7) or it may be a processor of the microcontroller 14.

Each drawer module 17*a*'-17*d*' includes a processor 64*a*-64*d* having an SPI, wherein the SPI is configured as a slave device. A serial clock SCK, serial data in SDI, and serial data out SDO for each processor 64*a*-64 are coupled to respective terminals (not shown) within each drawer module, and these terminals are coupled to corresponding terminals in the control module 13' via lines 66*a*, 66*b* and 66*c* (e.g., the SCK of the processor 60 is coupled to the SCK of each drawer module processor 64*a*-64*d*, etc.). Additionally, each drawer module 17*a*'-17*d*' also includes a plurality of inputs 48A-48D coupled to terminals (not shown) for receiving a slave select signal from the control module processor 60. One of the plurality of inputs (e.g., input 48A) is coupled to the slave select SS of the drawer module's processor, and unused inputs 48B-48D are output from each drawer module 17*a*'-17*b*' in a cascaded configuration (e.g., the second input 48B of drawer module 17*a*' becomes the first input for drawer module 17*b*', and so on).

In operation, the control module's processor 60 will drive select inputs S1 and S2 of the multiplexor 62 so as to select one of the plurality of drawer modules 17*a*'-17*d*'. The demultiplexor 62, based on the select inputs S1 and S2, will pass the slave select signal from the processor 60 to the appropriate processor 64*a*-64*d* in one of the drawer modules via inputs 48A-48D. The selected processor then will communicate with the processor 60 of the control module 13' via the serial clock, serial data in and serial data out connections, while the non-selected processors will ignore data from the processor 60.

For example, if the control module processor 60 is to communicate with the processor 64*b* of drawer module 17*b*', then the processor 60, via select inputs S1 and S2, will command the demultiplexor 62 to couple the input IN to output B, thereby coupling the slave select signal of processor 60 to the slave select signal SS of processor 64*b*. The processor 64*b* will detect the slave select signal and communicate via the serial digital in SDI and serial digital out SDO signals. Since the remaining processors will not see the slave select signal from the processor 60, they will ignore all data provided by the control module processor 60.

In a variation of the embodiment shown in FIG. 7*a*, the slave select SS from the processor 60 may be coupled to the processors 64*a*-64*c* of the access modules in a bus configuration (e.g., a daisy chain connection), and the serial clock SCK may be distributed through the demultiplexor 62 and inputs 48*a*-48*d*. This configuration is shown in FIG. 7*b*.

FIG. 8 illustrates another embodiment a control module 13" and drawer modules 17*a*"-17*d*" that utilize inter-integrated circuit (12C) configuration to communicate with one another. The control module 13" includes a processor 70 having 12C capabilities. A serial clock line is provided to an input IN of a first demultiplexor 72, and a serial data line is provided to an input of a second demultiplexor 74. Select lines S1 and S2 of each demultiplexor 72 and 74 are coupled to the processor 70. Each demultiplexor includes a plurality of outputs, which are coupled to terminals (not shown) of the control module 13". The processor 70, via select lines S1 and S2, can select which output A1, B1, C1 or D1 is coupled to the serial clock line of the processor 70, and which output A2, B2, C2 or D2 is to be coupled to serial data line of the processor 70. The 12C logic and the demultiplexors 70 and 72 form an exemplary first communication device, wherein each output of the demultiplexors corresponds to one secure area.

Each drawer module also includes a respective processor 76*a*-76*d* configured for 12C functionality, as well as two sets of inputs 48A-48D and 49A-49D for receiving data and clock signals from the processor 70. One of the plurality of inputs of the first set of inputs (e.g., input 48A) is coupled to serial clock input of the drawer module's processor, and unused inputs 48B-48D are output from each drawer module 17*a*"-17*b*" in a cascaded configuration (e.g., the second input 48B of drawer module 17*a*" becomes the first input for drawer module 17*b*", and so on). Similarly, one of the plurality of inputs of the second set of inputs (e.g., input 49A) is coupled to serial clock input of the drawer module's processor, and unused inputs 49B-49D are output from each drawer module 17*a*"-17*b*" in a cascaded configuration.

In operation, the processor 70, via select lines S1 and S2, selects one of the drawer modules for communications. The processor of the selected module, via the demultiplexors 72 and 74, is coupled to the serial data line and serial clock line of the processor 70, and receives data therefrom. The processors of the remaining modules do not communicate with the processor 70 until they are selected for such communication. Accordingly, the drawer systems 11, 11' and 11" enable physically identical drawer modules to control access to secure areas, without requiring specific settings for each drawer module. Further, various data can be provided to each drawer module for output on a display device or the like, and data collected by each drawer module can be readily communicated to the control module. Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A dispensing system for selectively controlling access to a plurality of secure areas, comprising:

a control module including a first communication device for communicating control data generated by said control module, said first communication device including a plurality of communication channels each assigned to a corresponding one of the plurality of secure areas; and a plurality of access modules each assigned to a corresponding one of the plurality of secure areas, each access module of the plurality of access modules including a plurality of inputs corresponding to the plurality of communication channels, wherein each access module enables or inhibits access to the corresponding secure area based on the control data from the control module as provided on at least one of the inputs, and wherein unused inputs within each access module are output in a cascaded configuration.

2. The system according to claim 1, wherein each access module includes access logic communicatively coupled to at least one input of the said plurality of inputs to receive said control data, said access logic configured to grant or deny access to the corresponding secure area based on said control data.

3. The system according to claim 2, wherein the control module comprises control logic configured to generate the control data for selectively controlling access to each of the plurality of secure areas, and the first communication device is communicatively coupled to said control logic for receiving said control data.

4. The system according to claim 3, wherein the control logic and the access logic comprise a serial peripheral interface.

5. The system according to claim 3, wherein the control logic and the access logic comprise a universal asynchronous receiver-transmitter (UART).

6. The system according to claim 3, wherein the control logic and the access logic comprise an inter-integrated circuit (12C) configuration.

7. The system according to claim 2, wherein the access logic includes a processor and memory, and computer executable instructions stored in memory, wherein when executed by said processor, cause the processor to grant or deny access to the corresponding secure area based on said control data.

8. The system according to claim 2, wherein at least one access module includes at least one of a) a display device, b) a control input for receiving data concerning the corresponding secure area, or c) a control output for providing data concerning the corresponding secure area, said at least one of the display device, control input or control output operatively coupled to said access logic.

9. The system according to claim 8, wherein the display device is at least one of a liquid crystal display device or a light emitting diode display device.

10. The system according to claim 8, wherein the control module is configured to provide display data to the at least one access module for display on the corresponding display device of the at least one access module, the display data indicative of a location of an object stored in the dispensing system.

11. The system according to claim 2, wherein at least one access module comprises a switch corresponding to the secure area and communicatively coupled to the access logic, the switch operative to provide information corresponding to a state of the respective secure area.

12. The system according to claim 2, further comprising:

a plurality of actuators each operative to grant or deny access to a corresponding one of the plurality of secure areas;

a driver circuit including a plurality of drivers for driving a load, wherein at least one driver of the plurality of drivers is operatively coupled to an actuator corresponding to an access module's secure area, and wherein the at least one driver is operatively coupled to the access logic.

13. The system according to claim 1, wherein the system is a medication dispensing unit.

14. The system according to claim 1, wherein at least one access module of the plurality of access modules is operative to detect a state of the corresponding secure area, and to communicate the detected state to the control module.

15. The system according to claim 1, wherein the plurality of access modules are physically identical to one another.

16. The system according to claim 15, wherein the plurality of access modules are arranged in a stacked configuration.

17. An access module for use in a system for selectively controlling access to a corresponding secure area, the access module comprising:

first and second inputs for receiving control data;

access logic communicatively coupled to the first input, said access logic configured to enable or inhibit access to the corresponding secure area based on the control data, wherein the first and second inputs are arranged such that the second input is output in a cascaded configuration to provide the second input to a first input of an adjacent access module.

18. The system according to claim 1, wherein the plurality of inputs comprise a first input and a second input, the second input being an unused input, and the second input is output in a cascaded configuration to provide the second input to a first input of an adjacent access module.

* * * * *